(12) United States Patent
Vance, Jr. et al.

(10) Patent No.: US 7,043,264 B2
(45) Date of Patent: May 9, 2006

(54) MESSAGE TRANSMISSION SYSTEM IN A GPRS ENVIRONMENT

(75) Inventors: Robert B. Vance, Jr., North Bend, WA (US); Anthony T. Patterson, Sumner, WA (US); Brian McElhinney, Seattle, WA (US); Joseph Parr, Redmond, WA (US); Charles A. Carey, Kirkland, WA (US)

(73) Assignee: America Online, Inc., Dulles, VA (US)

( * ) Notice: Subject to any disclaimer, the term of this patent is extended or adjusted under 35 U.S.C. 154(b) by 160 days.

(21) Appl. No.: 10/323,464

(22) Filed: Dec. 18, 2002

(65) Prior Publication Data

US 2004/0121785 A1 Jun. 24, 2004

(51) Int. Cl.
*H04Q 7/20* (2006.01)
*H04Q 7/38* (2006.01)

(52) U.S. Cl. ............... 455/466; 455/414.1; 455/414.4; 455/426.1; 455/426.2; 455/412.1; 455/412.2; 455/422.1; 370/351; 370/353; 370/354

(58) Field of Classification Search ............... 465/466, 465/414.1, 445, 426.1, 426.2, 406, 407, 408, 465/403, 414.3, 414.4, 422.1, 432.3, 432.1, 465/552.1, 553.1; 455/500, 517, 412.1, 412.7, 455/414.4, 458, 550.1; 370/351, 353, 354; 709/229; 340/7.2, 7.22, 7.52
See application file for complete search history.

(56) References Cited

U.S. PATENT DOCUMENTS

| | | | | |
|---|---|---|---|---|
| 5,878,351 | A * | 3/1999 | Alanara et al. | 455/466 |
| 6,256,498 | B1 | 7/2001 | Ludwig | 455/433 |
| 6,272,450 | B1 | 8/2001 | Hill et al. | 703/13 |
| 6,275,575 | B1 | 8/2001 | Wu | 379/202.01 |
| 6,356,838 | B1 | 3/2002 | Paul | 701/209 |
| 2001/0009855 | A1 * | 7/2001 | I'Anson | 455/445 |
| 2001/0077132 | | 7/2001 | I'anson et al. | |
| 2002/0006797 | A1 * | 1/2002 | Virtanen et al. | 455/445 |
| 2002/0077132 | A1 * | 6/2002 | Mizell et al. | 455/466 |
| 2004/0116119 | A1 * | 6/2004 | Lewis et al. | 455/435.1 |

FOREIGN PATENT DOCUMENTS

| | | |
|---|---|---|
| EP | 1 067 752 | 1/2001 |
| EP | 1 096 753 | 5/2001 |

(Continued)

OTHER PUBLICATIONS

*Short Message Services:* R. Hume; Dr. Dobb's Journal; Oct. 2001.

(Continued)

*Primary Examiner*—Keith T. Ferguson
(74) *Attorney, Agent, or Firm*—Michael A. Glenn; Glenn Patent Group

(57) ABSTRACT

A robust data delivery system between a server and a mobile client uses the Short Message Service (SMS) and General Packet Radio System (GPRS) services. A user and/or messaging provider set preferences on the mobile client for service coverage estimation that balances SMS and GPRS service coverage estimations for the mobile client, and/or service selection preferences that are expressed using a balance of cost of service and reliability of service. The mobile client receives a message from the server, sent using either the SMS or GPRS services. The mobile client checks the status of its SMS and GPRS signals. The mobile client weighs preference settings and the SMS and GPRS signal statuses to decide whether to answer the server using SMS or GPRS. If GPRS is selected, then the mobile client answers using GPRS; if SMS is selected, then the mobile answers using SMS.

65 Claims, 8 Drawing Sheets

FOREIGN PATENT DOCUMENTS

| | | |
|---|---|---|
| EP | 1 139 608 | 10/2001 |
| EP | 1 139 677 | 10/2001 |
| EP | 1 139 681 | 10/2001 |
| EP | 1 139 688 | 10/2001 |
| EP | 1 148 681 | 10/2001 |
| EP | 1 148 747 | 10/2001 |
| EP | 1 158 754 | 11/2001 |
| WO | WO 01/72062 | 9/2001 |

OTHER PUBLICATIONS

*Developing a Core Network to Prepare for 3G;* C. Clancy; Journal of the Institution of British Telecommunications Engineers; Jul.-Sep. 2000.

*Mascalla Revs Up with Mobility Launch;* P. Basso; Wall Street & Technology; Sep. 2000.

*GSM Phase 2+ General Packet Radio Service GPRS: Architecture, Protocols, and Air Interface;* Christian Bettsteter, Hand-Jorg Vogel, and Jorg Eberspacher; IEEE Communications Surverys; Third Quarter 1999.

*Digital Cellular telecommunications System (Phase 2+): Location Services (LCS); Service Description, Stage 1;* GSM Global System for Mobile Communications Technical Specification; Jul. 1999.

*Designating for Mobile and Distributed Work: Technology Use in Remote Settings;* J. Brodie and M. Perry; Designating for Mobile and Distributed Work.

*Reengineering the Corporation—A Manifesto for IT Evolution;* Harry Sneed, and Chris Verhoef.

*Personalized Options on No Answer Conditions—Introducing HTTP Based Menues Into IP multimedia Telephony;* Kristine Bolstad; Candidate for Scientific Thesis; May 2001; University of Oslo.

\* cited by examiner

MESSAGE TRANSMISSION SYSTEM IN A GPRS ENVIRONMENT

BACKGROUND OF THE INVENTION

1. Technical Field

The invention relates to data delivery and communication in personal electronic devices. More particularly, the invention relates to intelligently switching between communication protocols in personal wireless electronic devices.

2. Description of the Prior Art

Currently, the Short Message Service (SMS) is used by messaging services to communicate to wireless devices. SMS is provided by wireless carriers to the majority of their cell phone customers for text messaging, for example.

Referring to FIG. 1, SMS is used for sending and receiving messages between a messaging service 101 and a mobile device 104. Messages must be no longer than 160 alphanumeric characters and contain no images or graphics.

SMS is a store and forward system. This requires that an intermediate be provided to perform the store and forward functionality. A Short Message Service Center (SMSC) 102 ensures the timely delivery of messages to mobile clients 104. Communications between mobile clients 104 and SMS transmission facilities 103 are transient due to the mobile nature of the mobile clients 104. A mobile client 104 may be momentarily unreachable because the mobile client 104 has entered into a tunnel or garage, for example. The SMSC 102 has the ability to detect that the mobile client 104 is not available and will wait until the mobile client 104 comes back online.

The SMSC 102 delivers any waiting messages when the mobile client 104 comes back online, i.e., communication is restored. Messages will typically wait for three days on the SMSC 102 before they are deleted.

However, SMS is expensive for the carrier to maintain and provide. What drives the carrier's cost is how much the carrier has to pay for the infrastructure and the cost of the bandwidth.

The General Packet Radio System (GPRS) is a packet switched data network for mobile Global System for Mobile Communications (GSM) and time-division multiple access (TDMA) users. Packet switching means that GPRS radio resources are used only when users are actually sending or receiving data. GPRS involves overlaying a packet based air interface onto the existing circuit switched GSM network.

The main benefits of GPRS are that it reserves radio resources only when there is data to send and it reduces reliance on traditional circuit-switched network elements. The available radio resource can be concurrently shared between several users rather than dedicating a radio channel to a mobile data user for a fixed period of time.

With respect to FIG. 2, a messaging service 201 using the GPRS system sends messages to a mobile client 203 through the GPRS transmission service 202. GPRS is not a store and forward system as with SMS. Messages are sent from the messaging service 201 to the mobile client 203. If the mobile client 203 is not online, then the message is dropped and the messaging service 201 knows that the mobile client is not available because it does not receive a response from the mobile client 203.

GPRS has theoretical maximum data speeds of up to 171.2 kilobits per second (kbps). This is about three times as fast as the data transmission speeds that are possible over today's fixed telecommunications networks and ten times as fast as current Circuit Switched Data services on GSM networks. By allowing information to be transmitted more quickly, immediately, and efficiently across the mobile network, GPRS is a less costly mobile data service compared to SMS.

GPRS facilitates instant connections whereby information can be sent or received immediately as the need arises, subject to radio coverage. GPRS facilitates several new applications that have not previously been available over GSM networks due to the limitations in speed of Circuit Switched Data (9.6 kbps) and message length of the Short Message Service (160 characters). However, radio coverage for GPRS is currently limited because of the slow proliferation of GPRS transmission equipment.

It would be advantageous to provide a message transmission system in a GPRS environment that provides robust delivery of messages to and from wireless device users, such as cellular phones, using both SMS and GPRS. It would further be advantageous to provide a message transmission system in a GPRS environment that provides the user and messaging provider the ability to balance the use of communication systems on a cost versus convenience basis.

SUMMARY OF THE INVENTION

The invention provides a message transmission system in a GPRS environment. The system provides robust delivery of messages to and from wireless device users, such as cellular phones, using both Short Message Service (SMS) and General Packet Radio System (GPRS). In addition, the invention provides the user and messaging provider the ability to balance the use of the SMS and GPRS communication systems on a cost versus convenience basis.

A preferred embodiment of the invention provides an intelligent messaging server and mobile client that communicate using SMS and GPRS services. The mobile client allows the user and the messaging provider to set preferences on the mobile client. The mobile client allows a service coverage estimation to be set that balances the SMS and GPRS coverage estimations for the mobile client. This can be dependent upon the mobile client's location and expected coverage for each service within the mobile client's operational area. The mobile client also allows the setting of service selection preferences that are expressed using a balance of cost of service and reliability of service.

The mobile client can respond to the server using either SMS or GPRS. Depending on the preferences set by the user and/or provider and the mobile client's evaluation of its SMS and GPRS signal conditions, the mobile client will respond to the server using the protocol that it prefers. The server then switches from SMS to GPRS or vice versa, depending on the service that the mobile client uses.

The server tries to give the mobile client the opportunity to use its preferences to select the method of communication. When the server does not have an active GPRS session with the mobile client and the server needs to send the mobile client messages, the server will send a SMS wakeup message to the mobile client.

The SMS wakeup message allows the client to initiate a GPRS session if it prefers. The server sends SMS wakeup messages to the mobile client until the mobile client responds or if any GPRS or SMS messages timeout. Using this method, the server automatically fails over to sending messages to the mobile client using SMS when the mobile client loses its GPRS signal coverage or is turned off. Alternatively, to reduce costs, the server can re-send the GPRS message once before deciding to switch over to SMS.

The mobile client will know when it has a good GPRS signal and will tell the server when to switch over to the GPRS network by communicating with the server using GPRS. The mobile client will also know when it loses GPRS coverage and will then tell the server to switch from GPRS to SMS by communicating with the server using SMS.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a message transmission system in a GPRS environment. A system according to the invention provides robust delivery of messages to and from wireless device users, such as cellular phones, using both Short Message Service (SMS) and General Packet Radio System (GPRS). In addition, the invention provides the user and messaging provider the ability to balance the use of the SMS and GPRS communication systems on a cost versus convenience basis.

The invention provides a client-server system that has the ability to switch between SMS and GPRS either seamlessly, without the user's intervention, or by the user's request based on the user's service coverage estimation or preference of a balance of cost of service and reliability of service.

SMS is used for sending and receiving text messages between a messaging service and a mobile device. The messages are limited in length and cannot be longer than 160 alpha-numeric characters nor contain images or graphics. However, SMS is expensive to for the carrier to maintain and provide because of the infrastructure cost and the cost of the bandwidth.

GPRS is cheaper and faster, mainly because GPRS is meant to be widely used and that allows the GPRS carrier to distribute the infrastructure costs over a wider audience. GPRS is a relatively new message service and radio coverage for it is currently limited because of the slow proliferation of GPRS transmission equipment.

Figure 1:
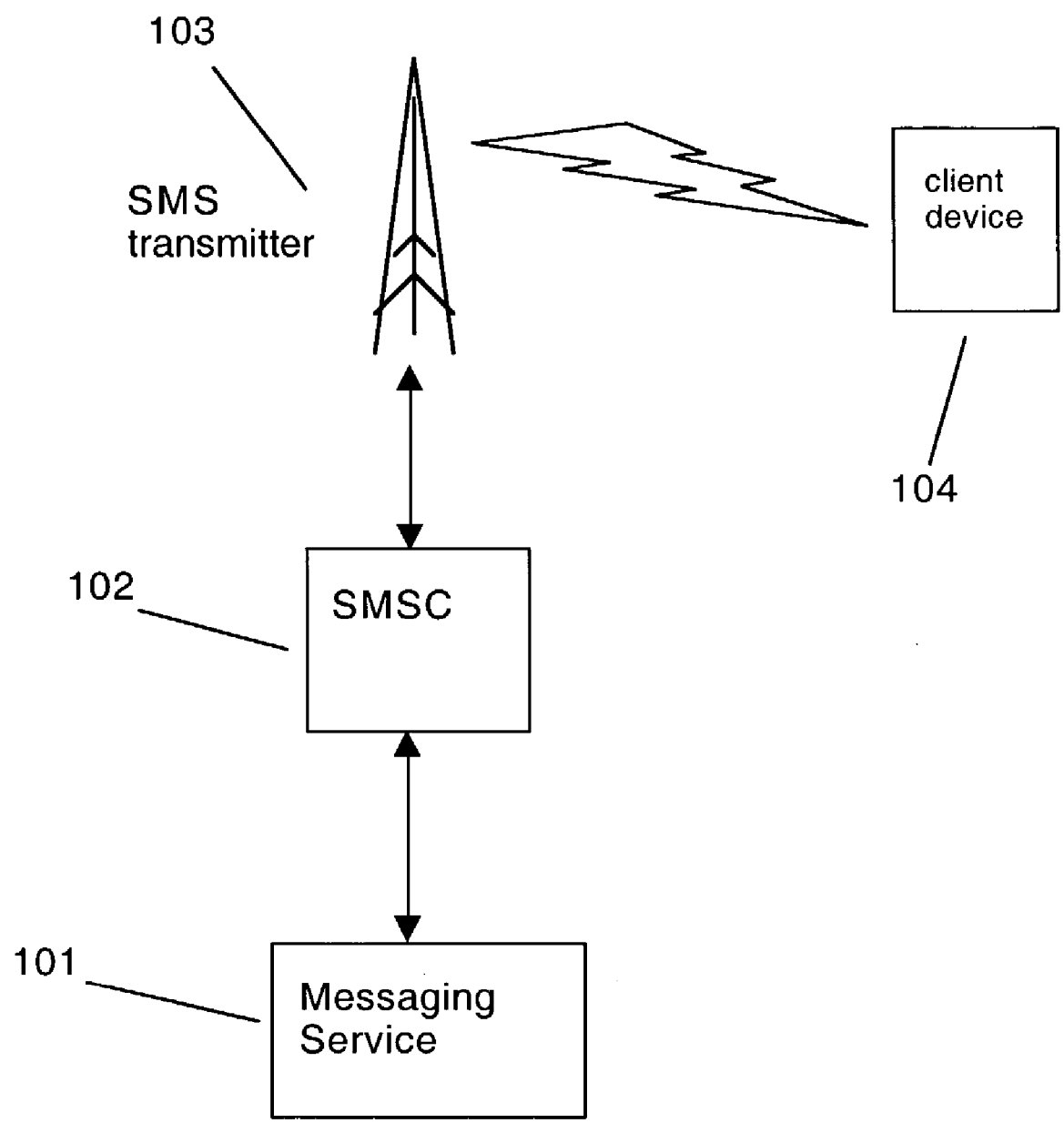
FIG. 1 is a block schematic diagram of a prior art approach using the Short Message Service (SMS) for transmission of text messages between a server and client according to the invention.
Figure 2:
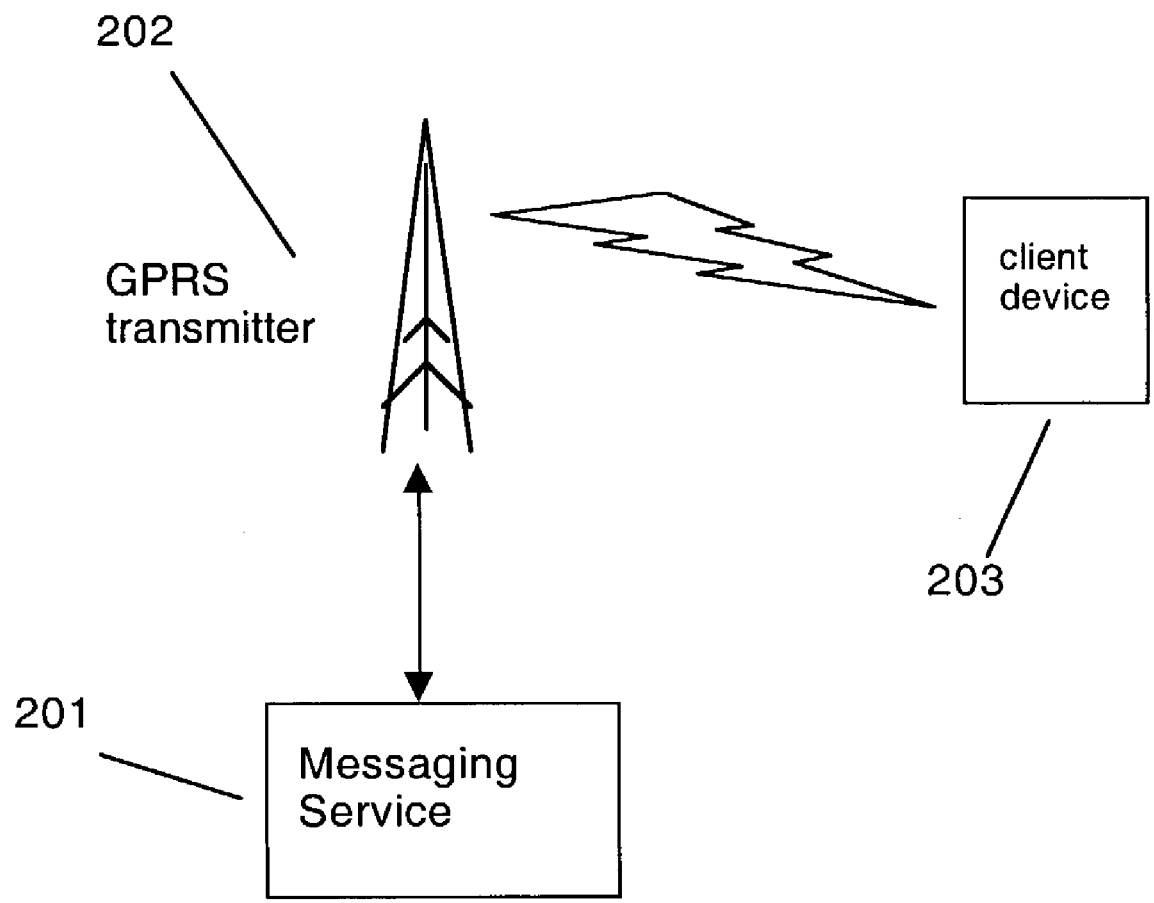
FIG. 2 is a block schematic diagram of a prior art approach using the General Packet Radio System (GPRS) for transmission of data between a server and a client according to the invention.
Figure 3:
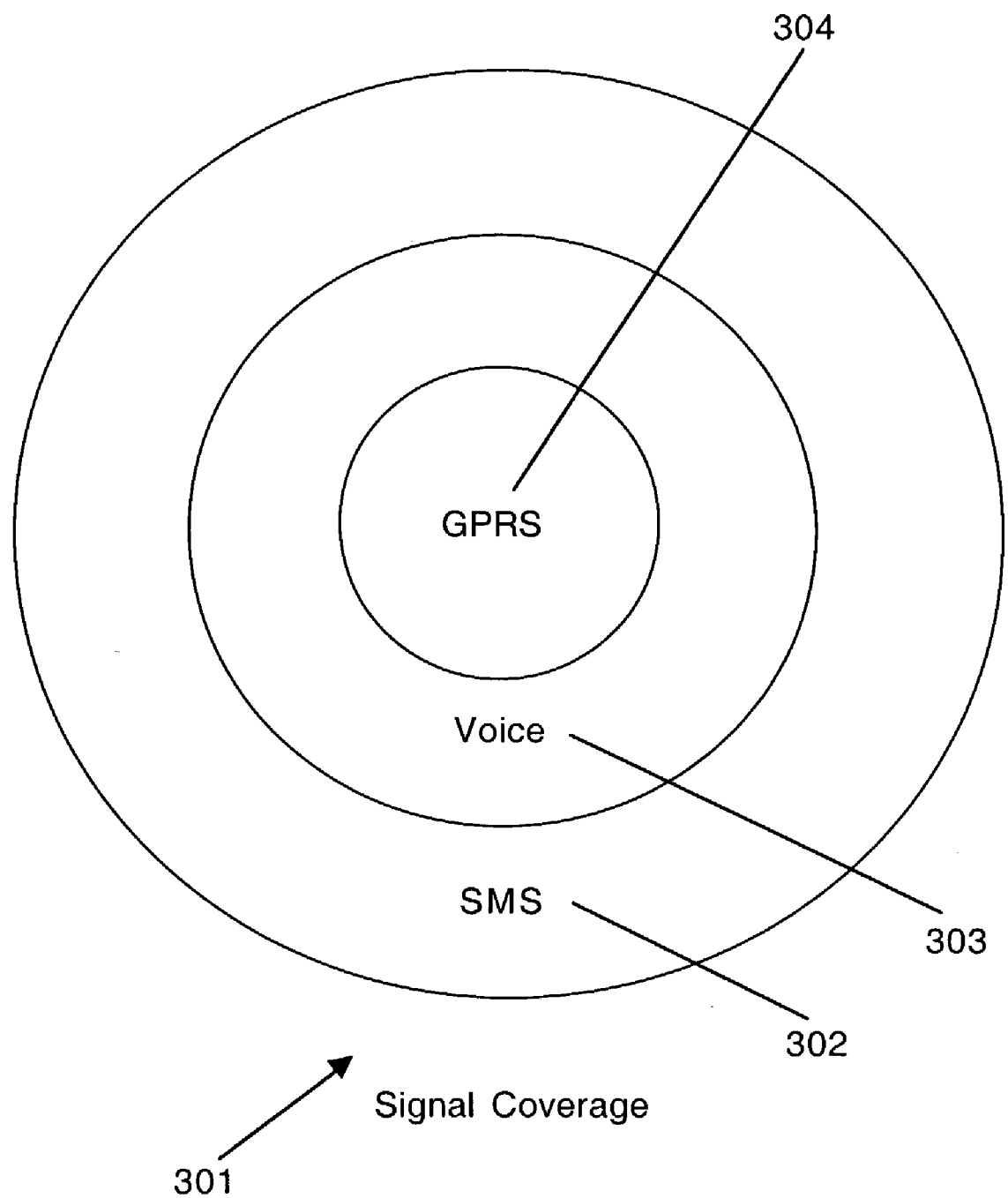
FIG. 3 is a schematic diagram of a comparison of signal coverage for SMS, Voice, and GPRS services according to the invention.

Referring to FIG. 3, the relative signal coverages 301 for SMS service 302, Voice service 303, and GPRS service 304 are shown. As noted above, GPRS 304 provides higher bandwidth over SMS 302. The area that the GPRS network covers 304, however, is smaller than the more commonly used SMS service 302. Therefore, if one is to use SMS 302, bandwidth is limited and if GPRS 304 is used, coverage area is limited.

Typical Voice service coverage 303 is smaller than the coverage that SMS provides 302. There are many times where voice services are lost while SMS messages are still being received by a client device. On the other hand, the coverage that GPRS services 303 provide is much less than the that of Voice services 303.

A problem arises when a customer signs up for advanced services provided by GPRS. The customer does not sign up for lost services—which occurs frequently due to the limited coverage of GPRS. The GPRS customer will look at SMS customers and see that when the GPRS customer loses his messaging capabilities, the SMS customer still has an operational messaging system. Further, GPRS services on many devices cannot be utilized while the phone is being used for voice communication.

The invention provides a system that combines SMS and GPRS to ensure the complete coverage that SMS provides, while giving the messaging provider the ability to reduce cost by using the GPRS system.

Figure 4:
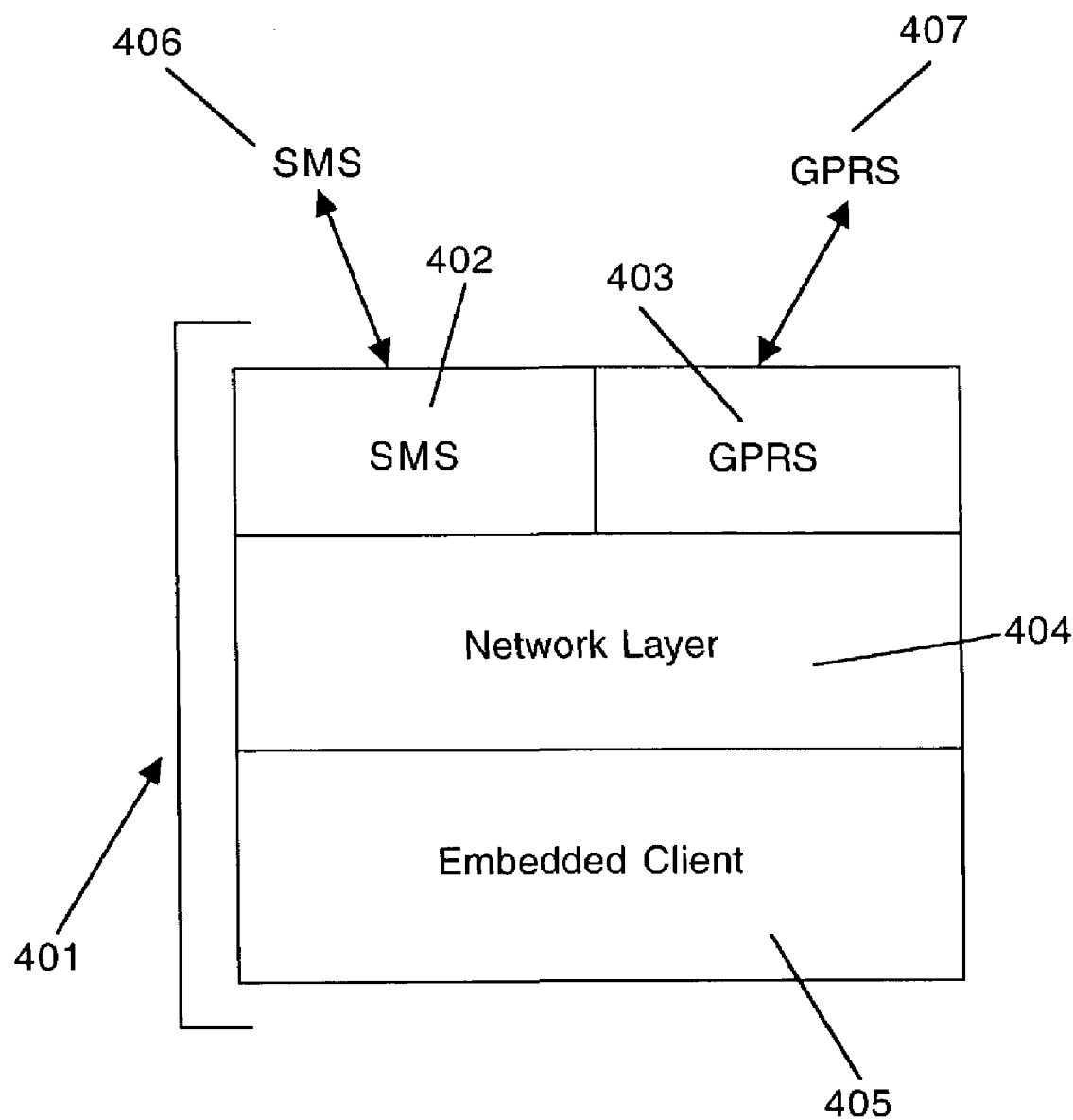
FIG. 4 is a block schematic diagram showing the client components using both SMS and GPRS services within a client system of a preferred embodiment of the invention according to the invention.

With respect to FIG. 4, handheld devices that communicate with an instant messaging service require a dedicated client application to be resident on the handheld device. The invention provides a client application 401 in a mobile client, such as a cell phone, for allowing the mobile client to experience the benefits of both the greater coverage area of SMS 406 and the higher bandwidth benefit of GPRS 407. The mobile client includes an SMS sending/receiving component 402 and a GPRS sending/receiving component 403, a network layer 404, and an embedded client 405. The embedded client can be a messaging client such as America Online, Inc.'s Instant Messenger (AIM). TCPIP is used to send messages between the client and the messaging service provider in a GPRS system.

The invention provides a mobile client-messaging server system that has the ability to switch between SMS and GPRS either seamlessly, without the user's intervention, or by the user and/or messaging provider's request based on the user's service coverage estimation or preference of a balance of cost of service and reliability of service.

For example, assuming that 1 Mb of data costs $4.00 across GPRS and each SMS message costs $0.20. A user that is on a budget may not want to receive any SMS messages because of the cost. Another user that does not care about the cost and wants to be in contact as much as possible would choose to receive SMS only. An average user would want an experience that is in between the two and would choose to have the system automatically switch between SMS and GPRS and seeks to use the lowest cost GPRS transport as much as possible, but has no problem with failing over to the SMS transport for the delivery of messages when GPRS is no longer available.

Both the messaging server and the mobile client have the intelligence to switch between the two services. The user and/or the messaging provider sets the combination of service coverage estimation or preference of a balance of cost of service and reliability of service, on the mobile client. The mobile client controls the selection of service dependent upon the user and/or messaging provider's preference settings.

Currently, for deployed embedded clients, GPRS restricts the initiation of communication between the server and the client to only starting on the client. The problem is that once a client logs onto a server, the client's user typically wants to stay logged on for hours. However, to a carrier, the connection is expensive. The carrier does not want the connection to remain up if there is no data being sent across the connection. The carrier will drop a connection after a timeout period. Instant messaging, for example, does not send data across a connection unless there is a need.

When a connection is dropped in GPRS, the user must recognize this condition and manually reconnect. This scenario does not work for instant messaging because the benefit of instant messaging is that other people can send messages to the user. With the connection dropped, how does the user know that someone is trying to send him a message? The server needs to make the connection to the client, but GPRS does not permit server initiated connections.

Figure 5:
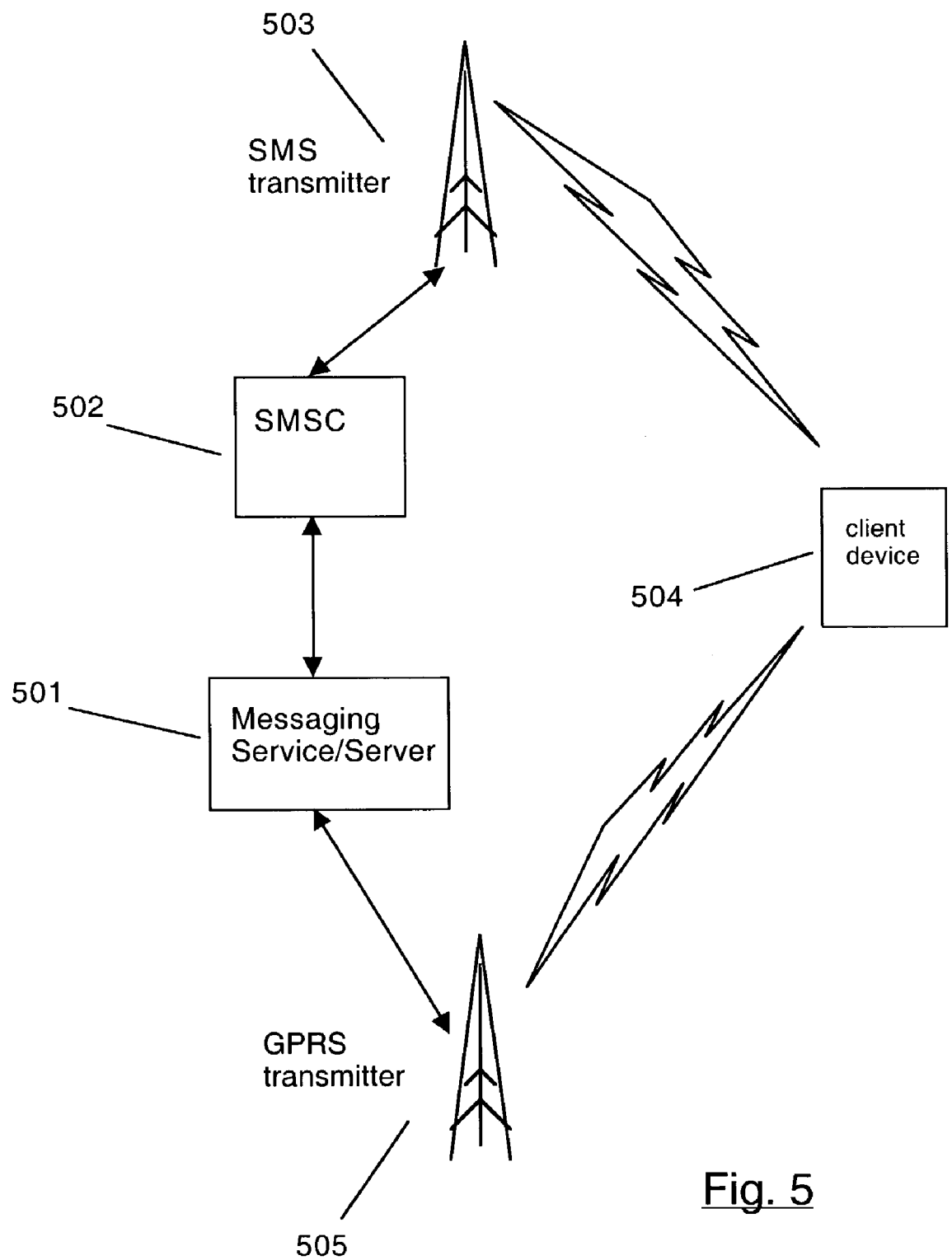
FIG. 5 is a block schematic diagram of a preferred embodiment of the invention's client and server communicating across SMS and GPRS according to the invention.

Referring to FIG. 5, the Messaging server 501 must somehow initiate a connection with the client 504 so the client 504 can initiate a GPRS connection. The only way to initiate a GPRS connection from the server side 501 is to somehow wake up the client 504 and have the client initiate the GPRS connection. The invention's Messaging server 501 sends an SMS message through the Short Message Service Center (SMSC) 502. The SMSC sends the SMS message through the SMS transmitter 503 to the client 504. The SMS message tells the client 504 to wake up and to communicate with the Messaging server 501. The client 504 then establishes a GPRS connection and receives messages waiting on the Messaging server 501 through the GPRS transmitter 505. With GPRS, the information may be split into separate but related packets before being transmitted and reassembled at the client 504 end.

One problem with relying on the client 504 is that it is assumed that once the client 504 receives the SMS message, it switches over to GPRS mode and stays there. This assumption is insufficient because there are many situations where the client 504 will lose GPRS connectivity, e.g., the client is in an elevator or a garage, or the client is in a fringe area where the GPRS connectivity is intermittent.

The invention's Messaging server 501 takes care of this situation by recognizing that it has sent a GPRS message to the client 504 and did not receive a response. The server 501 will automatically fail over to sending messages to the client 504 in SMS. The client 504 will know when it has a good GPRS signal and will tell the server 501 when to switch over to the GPRS network 505. The client 504 will also know when its GPRS signal goes away and will then tell the server 501 to switch from GPRS to SMS.

This dynamic relationship between the server and the client allows the two to manage their connection in real time based upon economic preferences and signal reception.

During normal GPRS communication between the Messaging server 501 and the client 504, the Messaging server 501 first sends a GPRS message to the client 504. If the GPRS message is not acknowledged (e.g., within a predetermined time period, such as one minute), then the Messaging server 501 sends a SMS message to the client 504. When the Messaging server 501 sends a SMS message to the client 504 and does not receive a response, the Messaging server 501 assumes the client 504 is not online (i.e., out of range, turned off, etc.). The Messaging server 501 lets the SMSC 502 handle sending the message to the client 504 and passively waits for a response.

Since SMS is a store and forward system the SMSC 502 ensures the timely delivery of messages to the client 504. The SMSC 502 has the ability to detect that the client 504 is not available and will wait until the client 504 comes back online. The SMSC 502 delivers any waiting messages when the client 504 comes back online, i.e., communication is restored. Messages will typically wait for three days on the SMSC 502 before they are deleted.

SMS has a limited use for the delivery of short messages. Instant messaging services, such as AIM, have expanded SMS beyond the original concept of delivering only short messages. GPRS, on the other hand, provides a greater variety of services. The GPRS network operates differently for each carrier. Some GPRS networks send messages once, while others may retry a few times before giving up.

Alternatively, to reduce costs, the Messaging server 501 can re-send the GPRS message before deciding to switch over to SMS. Response time is critical in the instant messaging arena because users expect short message transmission and receipt times, otherwise the users would rather use email.

The client 504 can respond to the server in either GPRS or SMS. Depending on the economic preferences set by the user and/or provider, the client 504 can respond to the Messaging server 501 using the same protocol that the Messaging server 501 used. The client 504 can alternatively respond to the Messaging server 501 using the protocol that it prefers. For example, if the economic model is lowest cost and the client 504 sees that it has a good GPRS signal and receives a message from the Messaging server 501 in SMS, the client 504 can respond using GPRS which would tell the Messaging server 501 that it should switch to GPRS. On the other hand, if the economic model is guaranteed delivery of messages, the client 504 may see that its GPRS signal is degraded and would respond to a Messaging server's GPRS message using SMS. The Messaging server 501 would then switch from GPRS to SMS.

One skilled in the art will readily appreciate that the invention applies to time-critical data services. Any type of mission critical application (e.g., package delivery services, real time inventory systems, etc.) that has the desire to deliver messages in as close to real time as possible with reliability and economic factors balanced against each other.

Figure 6:
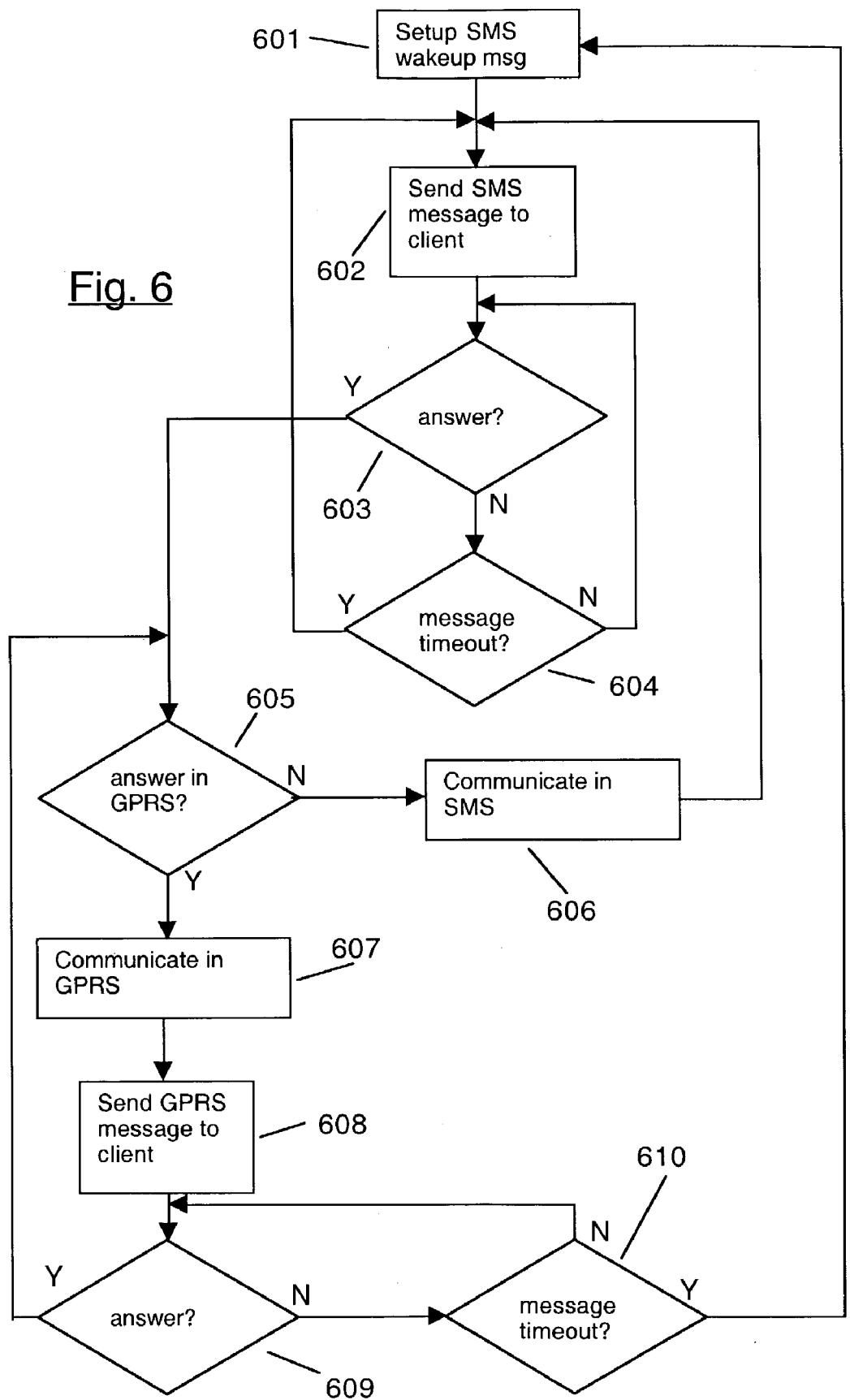
FIG. 6 is a block schematic diagram of a flowchart for a preferred embodiment of the invention's server handling SMS and GPRS messages sent to and received from a client according to the invention.

With respect to FIG. 6, a flowchart of the messaging server's operation is shown. The typical scenario will be that the server sends an SMS wakeup message to the client 601, 602 in order to send the client any waiting messages. At this point, a GPRS session between the server and the client does not exist. The server then waits for an answer from the client 603 or a timeout message from the SMSC 604. If the SMS message has timed out 604, then the server resends the SMS wakeup message to the client 602 and repeats the waiting cycle.

If an answer is received from the client 603, the server analyzes the client's answer to check if the answer was via GPRS or SMS 605. If the client's answer was in SMS, the server communicates with the client in SMS 606, 602 and continues with the SMS loop 602, 603, 604, sending and receiving SMS messages to and from the client until the client switches over to using GPRS.

If the client's answer used GPRS, then the server switches to communicating with the client using GPRS 607 and sends a message to the client using GPRS 608. The server waits for an answer from the client 609 or a timeout (e.g., one minute) 610. If the client answers the server 609, then the server again checks whether the client used SMS or GPRS for the answer 605. The server continues to communicate with the client using GPRS until a failure occurs.

If the server times out waiting for the client's answer 610, then the server begins attempting to wakeup the client using an SMS wakeup message 601, thereby falling back to SMS.

Figure 7:
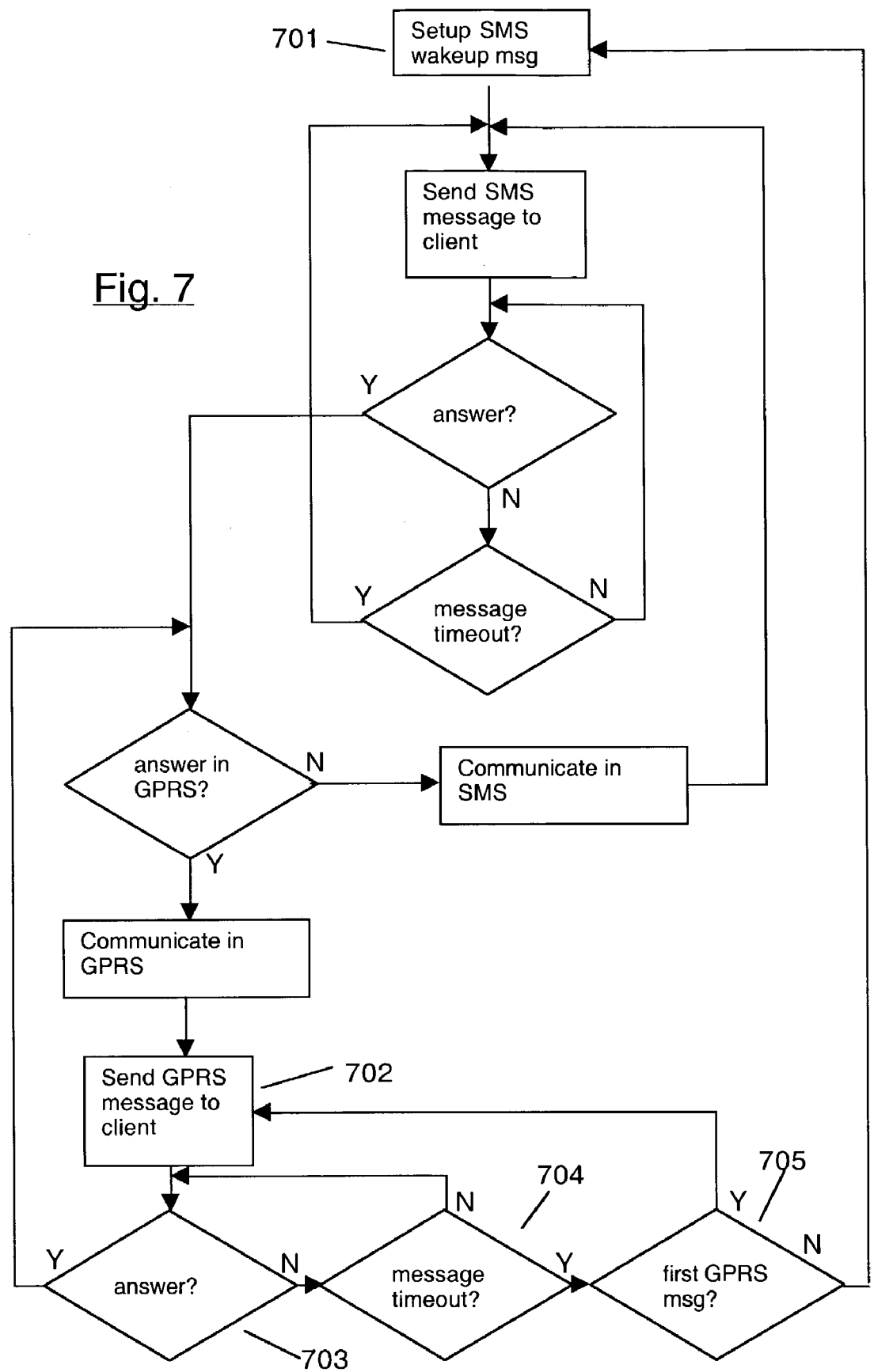
FIG. 7 is a block schematic diagram of a flowchart for another preferred embodiment of the invention's server handling SMS and GPRS messages sent to and received from a client according to the invention.

Referring to FIG. 7, the flowchart shown is an alternative embodiment of the invention that differs in the method used in FIG. 6 when a client fails to respond to a GPRS message. The server sends a GPRS message to the client 702. The server waits for the client to answer 703 or a timeout to occur 704. If a timeout occurs 704, the server then attempts to take the lower cost route by retransmitting the GPRS message 705, 702. The server will only retransmit the GPRS once. After sending the GPRS message twice, the server then falls back to using SMS and sends an SMS wakeup message to the client 701.

Figure 8:
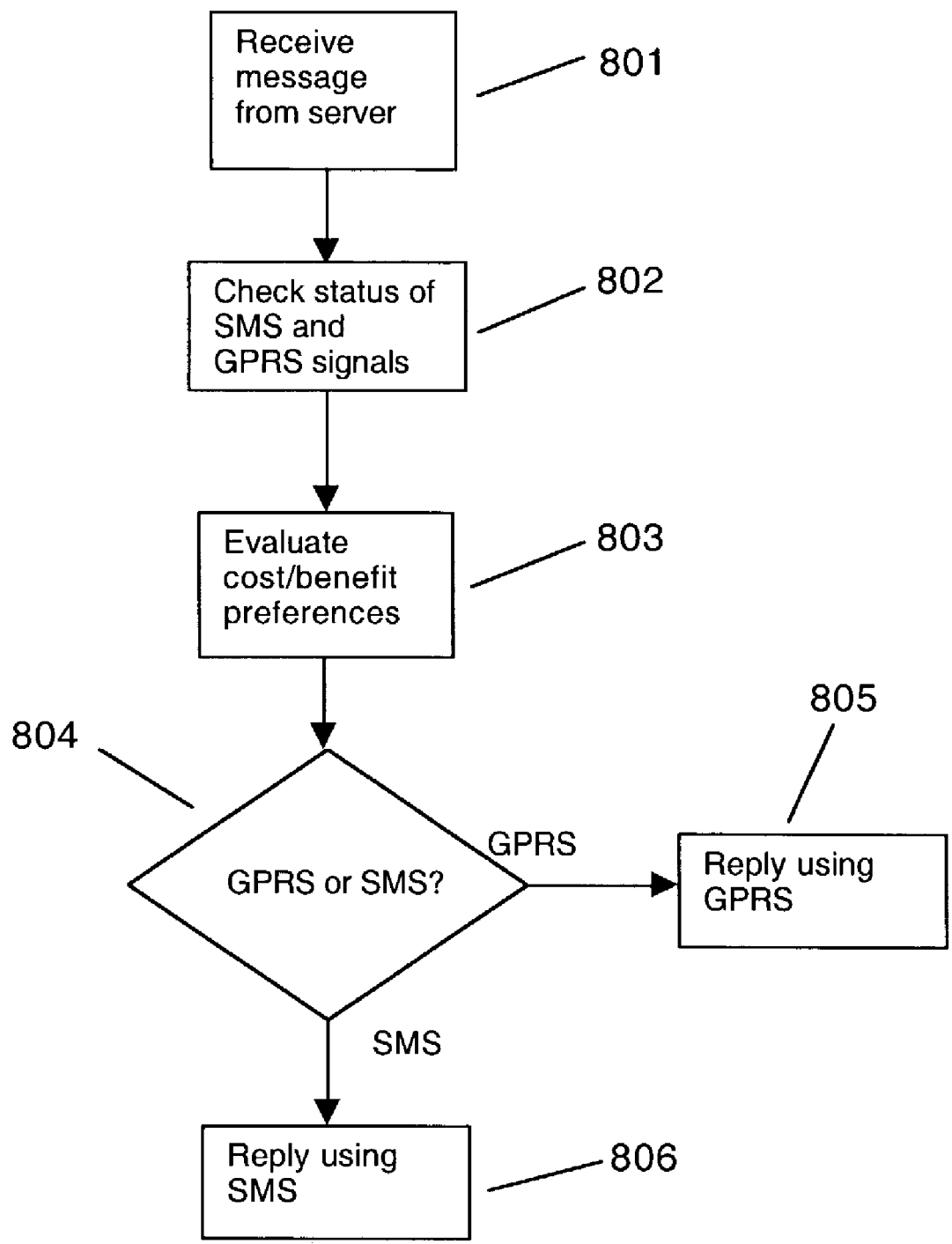
FIG. 8 is a block schematic diagram of a flowchart for a preferred embodiment of the invention's client dynamically selecting SMS and GPRS services for messages sent to a server according to the invention.

With respect to FIG. 8, a flowchart of a mobile client's operation is shown. The client allows the user and the messaging provider to set preferences on the client. The client allows a service coverage estimation to be set that balances the SMS and GPRS coverage estimations for the client. This can be dependent upon the client's location and expected coverage for each service within the client's operational area. The client also allows the setting of service selection preferences that are expressed using a balance of cost of service and reliability of service.

The client receives a message from the server 801. The message can be through either the SMS or GPRS services. The client checks the status of its SMS and GPRS signals 802. Given this information, the client evaluates its preference settings for service coverage estimation or balance of cost of service and reliability of service 803. It weighs the preferences combined with its SMS and GPRS signal statuses to decide whether to answer the server using SMS or GPRS 804. If GPRS is decided upon, then the client answers the server in GPRS 805. If a GPRS session has not been initiated, the client will initiate the session. If SMS is decided upon, the client responds to the server using SMS 806.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process for a robust data delivery system between a server and a mobile client using the Short Message Service (SMS) and General Packet Radio System (GPRS) communication services, comprising the steps of:

providing service preference setting means on said mobile client for allowing any of a user and a messaging provider to set preferences on said mobile client for any of: a service coverage estimation that balances SMS and GPRS service coverage estimations for said mobile client, and service selection preferences that are expressed using a balance of cost of service and reliability of service;

receiving a message on said mobile client from said server;

wherein said message is sent by said server using either the SMS or GPRS services;

wherein said mobile client checks the status of its SMS and GPRS signals;

providing signal selection means on said mobile client for weighing said preference settings and said SMS and GPRS signal statuses to decide whether to answer said server using SMS or GPRS;

wherein if said signal selection means selects GPRS, then said mobile client answers said server using GPRS; and wherein if said signal selection means selects SMS, then said mobile client answers said server using SMS.

2. The process of claim 1, wherein said mobile client initiates a GPRS session when answering said server using GPRS, if a session not been initiated.

3. The process of claim 1, further comprising the step of:

sending an SMS wakeup message from said server to said mobile client in an attempt to open a GPRS session with said mobile client; and wherein said mobile client initiates a GPRS session with said server in response to said SMS wakeup message if GPRS service is available to said mobile client.

4. The process of claim 3, further comprising the step of:

resending said SMS wakeup message if said SMS wakeup message has timed out; and wherein said resending step resends said SMS wakeup message each time a timeout occurs until said mobile client answers.

5. The process of claim 3, further comprising the steps of:

receiving a message on said server from said mobile client;

analyzing said mobile client's message to check if the message was sent via SMS or GPRS;

wherein if said mobile client's message was received via SMS, then said server communicates with said mobile client using SMS; and wherein if said mobile client's message was received via GPRS, then said server communicates with said mobile client using GPRS.

6. The process of claim 5, wherein if said mobile client does not receive a GPRS message from said server within a predetermined timeout period, then said server executes said sending step.

7. The process of claim 6, wherein said GPRS message timeout is set to one minute.

8. The process of claim 5, wherein if said mobile client does not receive a GPRS message from said server within a predetermined timeout period, then said server resends said GPRS message once more, and wherein if said mobile client does receive said resent GPRS message from said server within a predetermined timeout period, then said server executes said sending step.

9. The process of claim 8, wherein said GPRS message timeout is set to one minute.

10. The process of claim 1, further comprising the steps of:

receiving a message on said server from said mobile client;

analyzing said mobile client's message to check if the message was sent via SMS or GPRS;

wherein if said mobile client's message was received via SMS, then said server communicates with said mobile client using SMS; and wherein if said mobile client's message was received via GPRS, then said server communicates with said mobile client using GPRS.

11. The process of claim 10, wherein if said mobile client does not receive a GPRS message from said server within a predetermined timeout period, then said server sends an SMS wakeup message to said mobile client in an attempt to open a GPRS session with said mobile client.

12. The process of claim 11, wherein said GPRS message timeout is set to one minute.

13. The process of claim 10, wherein if said mobile client does not receive a GPRS message from said server within a predetermined timeout period, then said server resends said GPRS message once more, and wherein if said mobile client does receive said resent GPRS message from said server within a predetermined timeout period, then said server sends an SMS wakeup message to said mobile client in an attempt to open a GPRS session with said mobile client.

14. The process of claim 13, wherein said GPRS message timeout is set to one minute.

15. A process for a robust data delivery system between a server and a mobile client using the Short Message Service (SMS) and General Packet Radio System (GPRS) communication services, comprising the steps of:
   providing service preference setting means on said mobile client for allowing any of a user and a messaging provider to set preferences on said mobile client for any of: a service coverage estimation that balances SMS and GPRS service coverage estimations for said mobile client, and service selection preferences that are expressed using a balance of cost of service and reliability of service;
   providing signal checking means on said mobile client for checking the status of said mobile client's SMS and GPRS signals;
   providing signal selection means on said mobile client for weighing said preference settings and said SMS and GPRS signal statuses to decide whether to answer said server using SMS or GPRS;
   wherein if said signal selection means selects GPRS, then said mobile client sends a message to said server using GPRS; and
   wherein if said signal selection means selects SMS, then said mobile client sends a message to said server using SMS.

16. The process of claim 15, further comprising the step of:
   receiving a message on said mobile client from said server; and
   wherein said message is sent by said server using either the SMS or GPRS services.

17. The process of claim 16, further comprising the step of:
   sending an SMS wakeup message from said server to said mobile client in an attempt to open a GPRS session with said mobile client; and
   wherein said mobile client initiates a GPRS session with said server in response to said SMS wakeup message if GPRS service is available to said mobile client.

18. The process of claim 17, further comprising the step of:
   resending said SMS wakeup message if said SMS wakeup message has timed out; and
   wherein said resending step resends said SMS wakeup message each time a timeout occurs until said mobile client answers.

19. The process of claim 17, further comprising the steps of:
   receiving a message on said server from said mobile client;
   analyzing said mobile client's message to check if the message was sent via SMS or GPRS;
   wherein if said mobile client's message was received via SMS, then said server communicates with said mobile client using SMS; and
   wherein if said mobile client's message was received via GPRS, then said server communicates with said mobile client using GPRS.

20. The process of claim 19, wherein if said mobile client does not receive a GPRS message from said server within a predetermined timeout period, then said server executes said sending step.

21. The process of claim 20, wherein said GPRS message timeout is set to one minute.

22. The process of claim 19, wherein if said mobile client does not receive a GPRS message from said server within a predetermined timeout period, then said server resends said GPRS message once more, and wherein if said mobile client does receive said resent GPRS message from said server within a predetermined timeout period, then said server executes said sending step.

23. The process of claim 22, wherein said GPRS message timeout is set to one minute.

24. The process of claim 15, wherein said mobile client initiates a GPRS session when sending a message to said server using GPRS, if a session not been initiated.

25. The process of claim 15, further comprising the steps of:
   receiving a message on said server from said mobile client;
   analyzing said mobile client's message to check if the message was sent via SMS or GPRS;
   wherein if said mobile client's message was received via SMS, then said server communicates with said mobile client using SMS; and
   wherein if said mobile client's message was received via GPRS, then said server communicates with said mobile client using GPRS.

26. The process of claim 25, wherein if said mobile client does not receive a GPRS message from said server within a predetermined timeout period, then said server sends an SMS wakeup message to said mobile client in an attempt to open a GPRS session with said mobile client.

27. The process of claim 26, wherein said GPRS message timeout is set to one minute.

28. The process of claim 25, wherein if said mobile client does not receive a GPRS message from said server within a predetermined timeout period, then said server resends said GPRS message once more and wherein if said mobile client does receive said resent GPRS message from said server within a predetermined timeout period, then said server sends an SMS wakeup message to said mobile client in an attempt to open a GPRS session with said mobile client.

29. The process of claim 28, wherein said GPRS message timeout is set to one minute.

30. A process for a robust data delivery system between a server an a mobile client using the Short Message Service (SMS) and General Packet Radio System (GPRS) communication services, comprising the steps of:
   sending an SMS wakeup message from said server to said mobile client in an attempt to open a GPRS session with said mobile client;
   providing GPRS session initiation means on said client for initiating a GPRS session with said server in response to said SMS wakeup message, if GPRS service is available to said mobile client;
   providing service preference setting means on said mobile client for allowing a user and/or a messaging provider to set preferences on said mobile client for any of: a service coverage estimation that balances SMS and GPRS service coverage estimations for said mobile client, and service selection preferences that are expressed using a balance of cost of service and reliability of service;

providing signal checking means on said mobile client for checking the status of said mobile client's SMS and GPRS signals;

receiving a message on said mobile client from said server; and wherein said message is sent by said server using either the SMS or GPRS services;

providing signal selection means on said mobile client for weighing said preference settings and said SMS and GPRS signal statuses to decide whether to answer said server using SMS or GPRS;

wherein if said signal selection means selects GPRS, then said mobile client sends a message to said server using GPRS; and wherein if said signal selection means selects SMS, then said mobile client sends a message to said server using SMS.

31. The process of claim 30, wherein said mobile client initiates a GPRS session when sending a message to said server using GPRS, if a session not been initiated.

32. The process of claim 30, further comprising the step of:

resending said SMS wakeup message if said SMS wakeup message has timed out; and wherein said resending step resends said SMS wakeup message each time a timeout occurs until said mobile client answers.

33. A process for a robust data delivery system between a server and a mobile client using the Short Message Service (SMS) and General Packet Radio System GPRS communication services, comprising the steps of:

sending an SMS wakeup message from said server to said mobile client to initiate a communications session with said mobile client;

receiving a message on said server from said mobile client;

analyzing said mobile client's message to check if the message was sent via SMS or GPRS;

wherein if said mobile client's message was received via SMS, then said server communicates with said mobile client using SMS; and wherein if said mobile client's message was received via GPRS, then said server communicates with said mobile client using GPRS.

34. An apparatus for a robust data delivery system between a server and a mobile client using the Short Message Service (SMS) and General Packet Radio System (GPRS) communication services, comprising:

service preference setting means on said mobile client for allowing any of a user and a messaging provider to set preferences on said mobile client for any of: a service coverage estimation that balances SMS and GPRS service coverage estimations for said mobile client, and service selection preferences that are expressed using a balance of cost of service and reliability of service;

a module for receiving a message on said mobile client from said server;

wherein said message is sent by said server using either the SMS or GPRS services;

wherein said mobile client checks the status of its SMS and GPRS signals;

signal selection means on said mobile client for weighing said preference settings and said SMS and GPRS signal statuses to decide whether to answer said server using SMS or GPRS;

wherein if said signal selection means selects GPRS, then said mobile client answers said server using GPRS; and wherein if said signal selection means selects SMS, then said mobile client answers said server using SMS.

35. The apparatus of claim 34, wherein said mobile client initiates a GPRS session when answering said server using GPRS, if a session not been initiated.

36. The apparatus of claim 34, further comprising:

a module for sending an SMS wakeup message from said server to said mobile client in an attempt to open a GPRS session with said mobile client; and wherein said mobile client initiates a GPRS session with said server in response to said SMS wakeup message if GPRS service is available to said mobile client.

37. The apparatus of claim 36, further comprising:

a module for resending said SMS wakeup message if said SMS wakeup message has timed out; and wherein said resending module resends said SMS wakeup message each time a timeout occurs until said mobile client answers.

38. The apparatus of claim 37, wherein if said mobile client does not receive a GPRS message from said server within a predetermined timeout period, then said server executes said sending module.

39. The apparatus of claim 38, wherein said GPRS message timeout is set to one minute.

40. The apparatus of claim 37, wherein if said mobile client does not receive a GPRS message from said server within a predetermined timeout period, then said server resends said GPRS message once more, and wherein if said mobile client does receive said resent GPRS message from said server within a predetermined timeout period, then said server executes said sending module.

41. The apparatus of claim 40, wherein said GPRS message timeout is set to one minute.

42. The apparatus of claim 34, further comprising:

a module for receiving a message on said server from said mobile client;

a module for analyzing said mobile client's message to check if the message was sent via SMS or GPRS;

wherein if said mobile client's message was received via SMS, then said server communicates with said mobile client using SMS; and wherein if said mobile client's message was received via GPRS, then said server communicates with said mobile client using GPRS.

43. The apparatus of claim 42, wherein if said mobile client does not receive a GPRS message from said server within a predetermined timeout period, then said server sends an SMS wakeup message to said mobile client in an attempt to open a GPRS session with said mobile client.

44. The apparatus of claim 43, wherein said GPRS message timeout is set to one minute.

45. The apparatus of claim 42, wherein if said mobile client does not receive a GPRS message from said server within a predetermined timeout period, then said server resends said GPRS message once more, and wherein if said mobile client does receive said resent GPRS message from said server within a predetermined timeout period, then said server sends an SMS wakeup message to said mobile client in an attempt to open a GPRS session with said mobile client.

46. The apparatus of claim 45, wherein said GPRS message timeout is set to one minute.

47. An apparatus for a robust data delivery system between a server and a mobile client using the Short Message Service (SMS) and General Packet Radio System (GPRS) communication services, comprising:
   service preference setting means on said mobile client for allowing any of a user and a messaging provider to set preferences on said mobile client for any of: a service coverage estimation that balances SMS and GPRS service coverage estimations for said mobile client, and service selection preferences that are expressed using a balance of cost of service and reliability of service;
   signal checking means on said mobile client for checking the status of said mobile client's SMS and GPRS signals;
   signal selection means on said mobile client for weighing said preference settings and said SMS and GPRS signal statuses to decide whether to answer said server using SMS or GPRS;
   wherein if said signal selection means selects GPRS, then said mobile client sends a message to said server using GPRS; and
   wherein if said signal selection means selects SMS, then said mobile client sends a message to said server using SMS.

48. The apparatus of claim 47, further comprising:
   a module for receiving a message on said mobile client from said server; and
   wherein said message is sent by said server using either the SMS or GPRS services.

49. The apparatus of claim 48, further comprising:
   a module for sending an SMS wakeup message from said server to said mobile client in an attempt to open a GPRS session with said mobile client; and
   wherein said mobile client initiates a GPRS session with said server in response to said SMS wakeup message if GPRS service is available to said mobile client.

50. The apparatus of claim 49, further comprising:
   a module for resending said SMS wakeup message if said SMS wakeup message has timed out; and
   wherein said resending module resends said SMS wakeup message each time a timeout occurs until said mobile client answers.

51. The apparatus of claim 49, further comprising:
   a module for receiving a message on said server from said mobile client;
   a module for analyzing said mobile client's message to check if the message was sent via SMS or GPRS;
   wherein if said mobile client's message was received via SMS, then said server communicates with said mobile client using SMS; and
   wherein if said mobile client's message was received via GPRS, then said server communicates with said mobile client using GPRS.

52. The apparatus of claim 51, wherein if said mobile client does not receive a GPRS message from said server within a predetermined timeout period, then said server executes said sending module.

53. The apparatus of claim 52, wherein said GPRS message timeout is set to one minute.

54. The apparatus of claim 51, wherein if said mobile client does not receive a GPRS message from said server within a predetermined timeout period, then said server resends said GPRS message once more, and wherein if said mobile client does receive said resent GPRS message from said server within a predetermined timeout period, then said server executes said sending module.

55. The apparatus of claim 54, wherein said GPRS message timeout is set to one minute.

56. The apparatus of claim 47, wherein said mobile client initiates a GPRS session when sending a message to said server using GPRS, if a session not been initiated.

57. The apparatus of claim 47, further comprising:
   a module for receiving a message on said server from said mobile client;
   a module for analyzing said mobile client's message to check if the message was sent via SMS or GPRS;
   wherein if said mobile client's message was received via SMS, then said server communicates with said mobile client using SMS; and
   wherein if said mobile client's message was received via GPRS, then said server communicates with said mobile client using GPRS.

58. The apparatus of claim 57, wherein if said mobile client does not receive a GPRS message from said server within a predetermined timeout period, then said server sends an SMS wakeup message to said mobile client in an attempt to open a GPRS session with said mobile client.

59. The apparatus of claim 58, wherein said GPRS message timeout is set to one minute.

60. The apparatus of claim 57, wherein if said mobile client does not receive a GPRS message from said server within a predetermined timeout period, then said server resends said GPRS message once more, and wherein if said mobile client does receive said resent GPRS message from said server within a predetermined timeout period, then said server sends an SMS wakeup message to said mobile client in an attempt to open a GPRS session with said mobile client.

61. The apparatus of claim 60, wherein said GPRS message timeout is set to one minute.

62. An apparatus for a robust data delivery system between a server and a mobile client using the Short Message Service (SMS) and General Packet Radio System (GPRS) communication services, comprising:
   a module for sending an SMS wakeup message from said server to said mobile client in an attempt to open a GPRS session with said mobile client;
   a module for providing GPRS session initiation means on said client for initiating a GPRS session with said server in response to said SMS wakeup message, if GPRS service is available to said mobile client;
   service preference setting means on said mobile client for allowing a user and/or a messaging provider to set preferences on said mobile client for any of: a service coverage estimation that balances SMS and GPRS service coverage estimations for said mobile client, and service selection preferences that are expressed using a balance of cost of service and reliability of service;
   signal checking means on said mobile client for checking the status of said mobile client's SMS and GPRS signals;
   a module for receiving a message on said mobile client from said server; and
   wherein said message is sent by said server using either the SMS or GPRS services;
   signal selection means on said mobile client for weighing said preference settings and said SMS and GPRS signal statuses to decide whether to answer said server using SMS or GPRS;

wherein if said signal selection means selects GPRS, then said mobile client sends a message to said server using GPRS; and wherein if said signal selection means selects SMS, then said mobile client sends a message to said server using SMS.

63. The apparatus of claim 62, wherein said mobile client initiates a GPRS session when sending a message to said server using GPRS, if a session not been initiated.

64. The apparatus of claim 62, further comprising:
a module for resending said SMS wakeup message if said SMS wakeup message has timed out; and
wherein said resending module resends said SMS wakeup message each time a timeout occurs until said mobile client answers.

65. An apparatus for a robust data delivery system between a server and a mobile client using the Short Message Service (SMS) and General Packet Radio System (GPRS) communication services, comprising:
a module for sending an SMS wakeup message from said server to said mobile client client to begin a communications session with said mobile client;
a module for receiving a message on said server from said mobile client;
a module for analyzing said mobile client's message to check if the message was sent via SMS or GPRS;
wherein if said mobile client's message was received via SMS, then said server communicates with said mobile client using SMS; and
wherein if said mobile client's message was received via GPRS, then said server communicates with said mobile client using GPRS.

* * * * *